United States Patent [19]

Kemp et al.

[11] 3,857,737
[45] Dec. 31, 1974

[54] SEQUENTIAL CATALYZATION OF FUEL CELL SUPPORTED PLATINUM CATALYST

[75] Inventors: Fred S. Kemp, Ellington; Michael A. George, Bethel, both of Conn.

[73] Assignee: United Aircraft Corporation, East Hartford, Conn.

[22] Filed: Sept. 18, 1973

[21] Appl. No.: 398,356

[52] U.S. Cl. .................. 136/120 FC, 117/160 R
[51] Int. Cl. .................. H01m 27/10, C23c 3/04
[58] Field of Search ... 136/120 FC, 121, 122, 86 D; 117/160 R

[56] References Cited
UNITED STATES PATENTS

| | | | |
|---|---|---|---|
| 2,773,844 | 12/1956 | Carlson et al. | 117/160 R X |
| 3,287,171 | 11/1966 | Holt | 136/120 FC |
| 3,405,007 | 10/1968 | Waters | 117/160 R X |
| 3,423,226 | 1/1969 | Jensen | 117/160 R X |
| 3,470,019 | 9/1969 | Steele | 117/160 R X |
| 3,778,295 | 12/1973 | Smith et al. | 117/160 R X |

Primary Examiner—Allen B. Curtis
Attorney, Agent, or Firm—M. P. Williams

[57] ABSTRACT

A fuel cell electrode catalyst, adapted for application to a carbon fiber support mat substrate to form a fuel cell electrode, comprising small crystals of a noble metal fuel cell catalyst specie, such as platinum, deposited on discrete particles of an inert carrier or support such as carbon powder, is formed by the repetitive process of: mixing the powder with a dilute solution of the salt so as to form a slurry, the slurry then being concentrated and dried followed by the decomposition of the salt to form a partial product which is then used in place of the carrier powder in a repetition of the process until the desired concentration of catalyst is achieved. Usage of a low concentration of catalyst salt results in a smaller crystallite, which yields a higher surface area of catalyst, for a more active electrode that provides an improved current/voltage performance characteristic at a lower cost.

7 Claims, No Drawings

SEQUENTIAL CATALYZATION OF FUEL CELL SUPPORTED PLATINUM CATALYST

BACKGROUND OF THE INVENTION

1. Field of the Invention

This invention relates to fuel cell catalytic chemistry and more particularly to improved supported noble metal catalyst for fuel cell electrodes.

2. Description of the Prior Art

As is known, a fuel cell generates electricity (together with by-products such as heat and water) from an electrochemical catalytic reaction of hydrogen and oxygen. In acid-type fuel cells, such as are used in commercial application, a preferred catalyst is platinum (although other noble metals may be used). It is known to provide fuel cell electrodes containing the platinum catalyst by the deposition of platinum crystals on individual particles of a carbon powder carrier which, when mixed with a suitable binder, such as polytetrafluoroethylene (P.T.F.E. or Teflon), can be applied as a coating by means of spraying, filtered transfer, or screened printing, onto a substrate which may typically comprise a random carbon fiber mat. The carbon powder serves only as a carrier or support for the platinum crystals. This method of providing a supported platinum catalyst not only permits generation of a large surface area of platinum with a minimum of platinum material used, it also disposes the platinum catalyst in a position which renders it easily accessible by the reactants in the fuel cell.

In operation, the fuel cell catalytic reaction is necessarily dependent upon the magnitude of effective surface area of the platinum catalyst on the electrodes. If there is a low effective surface area (that is, surfaces of the platinum not readily accessible by the fuel cell reactants), then there is a tendency for higher current drains to result in higher voltage drops than are desired.

Since the platinum is extremely expensive, it is desirable to achieve the greatest surface area of platinum per unit of material utilized in formulating the catalyst. In addition, the application of the fuel cell to commercial and domestic purposes requires that the efficiency of the fuel cell reaction be as high as possible, in order to promote the most efficient generation of electricity possible.

SUMMARY OF THE INVENTION

The principle object of the present invention is provision of an improved supported platinum fuel cell catalyst.

According to the present invention, dilute solutions of a catalyst are used to sequentially deposit small catalyst crystals on a carrier in a series of several process iterations until a desired concentration is reached.

In further accord with the invention, a fuel cell electrode catalyst comprising crystals of a noble metal fuel cell catalyst specie deposited on particles of an inert carrier or support powder is prepared by (a) mixing a slurry of inert carrier powder and a solution of a salt of the fuel cell catalyst specie, (b) concentrating and drying the solution, (c) decomposing the platinum salt to form a partial product powder of less than a desired concentration of small catalyst crystals adhered to the inert carrier particles, (d) mixing a slurry of said partial product powder and a solution of a salt of said fuel cell catalyst, (e) repeating step (b), (f) decomposing the salt to form a powder of a higher concentration of catalyst, and (g) repeating steps (d)–(f) as necessary to form a final product powder of a desired concentration of catalyst on carrier particles.

The present invention provides a carbon-supported platinum catalyst having smaller platinum crystals, and a concomitant higher effective surface area of platinum per unit of material used in the formulation thereof than does a similar catalyst made in a single step with a higher concentration solution of platinum salt. Because of the small crystallite, a catalyst in accordance with the present invention provides imporved catalytic activity of electrodes in a fuel cell. The invention is readily adapted for use on both cathodes and anodes in base-type and acid type fuel cells.

DESCRIPTION OF THE PREFERRED EMBODIMENT

Consider, as an exemplary, simplified characterization of the invention, a requirement for a carbon-supported platinum fuel cell electrode in which a certain effective surface area of platinum is necessary. In accordance with the prior art, this may be achieved by utilizing a solution of a platinum salt in water, nitric acid, or other suitable solvent, of a sufficient concentration so that in the preparation of a slurry of the salt solution and carbon powder, the required platinum surface area would be achieved. In accordance with the invention, utilizing the same total quantity of platinum to achieve a higher effective surface area, with a larger number of smaller platinum crystals adhered to the carbon particles, is achieved by the use of much weaker solutions of the platinum salt a number of times. For instance, using a 5% solution to prepare the slurry, and using the product to prepare a further slurry, four times, will achieve the same concentration of platinum as the use of 20% solution one time, but the surface area will be greater due to the smaller crystallite. This is due to the fact that smaller crystals are deposited from more dilute solutions, as a result of lower availability of platinum; and repeating the process tends to generate new crystals with minimal growth of the old crystals.

Consider now an example of the present invention in which 20% by weight of platinum is disbursed on the surface of carbon particles. One gram of platinum diammino dinitrite is mixed in a 30% solution of nitric acid. Into this solution, 10 grams of graphitized carbon powder, formed by heating amorphus carbon powder (such as that sold under the trade name Vulcan XC-72 by Cabot Corporation, Boston, Mass.) in an inert atmosphere to about 2800° C for approximately 6 hours. The Vulcan XC-72 powder may have a surface area on the oder of 200 square meters per gram of material, and the graphitized powder may have a surface area of on the order of 90 square meters per gram of material; the graphitized carbon powder particle size is on the order of 1 to 5 microns in diameter.

The slurry thus formed is stirred at about 150° F for about one-half hours to slowly concentrate the platinum salt so that the platinum salt is deposited on the carbon particles; This may be accomplished on a magnetic hotplate stirrer of a type which is readily available in the marketplace. Thereafter, when the slurry is nearly dried to a paste, it is placed in an oven at about 250° F for one-half hour or so to completely dry the powder so as to form a cakey powder in which the platinum salt is dried into (adsorbed on) the carbon powder. This cakey powder is ground with a pestle in a mortar to restore it to a fine powder. The powder is then heated in an oven at about 500° F, in an air flow, for approximately 3 hours in order to decompose the platinum salt, drive off ammonia and other nitrogen compounds, and leave platinum crystals and/or platinum oxide crystals on the carbon powder particles. (The relative concentration of platinum versus platinum oxides is not known, and is not important to the present invention). This results in a fine powder having approximately 5% by weight platinum deposited on the carbon particles.

Thereafter, the 5% platinum powder product is mixed into another solution of one gram of platinum diammino dinitrite in a 30% solution of nitric acid, and the foregoing mixing (stirring), drying, grinding and decomposing are repeated to achieve a fine powder having approximately 10% platinum by weight deposited on the carbon particles. Then thet 10% platinum product is again utilized and the procedures repeated so as to achieve substantially a 15% platinum product, which is utilized in a repetition of the process so as to achieve a substantially 20% platinum product.

The above example is representative only, and it should be obvious to those skilled in fuel cell catalytic chemistry that the present invention may be applied in numerous similar processes. For instance, there is a limitless number of platinum salts which may be dissolved in suitable solvents. The choice of the salts and the solvents (so long as the solvent is compatible with the carrier powder) can be left to those skilled in the art since the final product is not dependent thereon. The salt, solvent and/or concentration of solution may be different in successive depositions without altering the final product, in the practice of this invention. Further, the concentrations used can be altered to suit design expedience in accordance with the skill of the art; for instance, one-half of a gram of platinum diammino dinitrite may be utilized in a 30% solution of nitric acid in a process which is repeated eight times to achieve the same 20% product as described hereinbefore, with smaller crystallite and therefore a still further increase in the effective surface. Similarly, concentrations may be chosen so as to achieve, in any one iteration of the process, any fraction of desired concentration of noble metal fuel cell catalyst deposited on the carbon carrier, and deposition repeated a sufficient number of times (even with different concentrations, salts or solvents) so as to achieve the overall desired percentage of platinum catalyst in the carbon powder carrier. In fact, 10 iterations yield a larger surface area than does nine iterations; however, it may be too expensive to use more than five or six iterations, which has been found to be satisfactory; less than three provide unsatisfactory results. The higher the desired concentration of catalyst in the final product, the more iterations (up to a point) are desirable, to take advantage of the present invention. In choosing specific materials for utilization in the practice of the present invention, reference may be made to chemistry handbooks for the determination of temperatures required for decomposition of the salt, and so forth, all as is well-known in the catalytic chemistry art. Although the salt may be decomposed in other ways (such as hydrogen reduction), it has been found that thermal decomposition is preferred since it yields more effective supported catalyst. The invention has found utilization in final concentrations of 1% to 50% catalyst on 99% to 50% support powder, but is usually practiced to achieve from 5% to 20% catalyst on from 95% to 80% support powder. The significant aspect of the present invention is that, in any given process for the formulation of a supported catalyst of a desired concentration from a given amount of catalyst specie, use of more dilute solutions of less than said given amount of catalyst specie in the formulation of partial products, several times, so as to provide sequentially, step-by-step, the total desired concentration of supported catalyst on an inert carrier, results in smaller crystallites having a larger surface area, which in turn provide a more active electrode (as described more fully hereinafter), thereby to improve fuel cell operation, and particularly the current/voltage performance characteristics thereof.

In the process of the prior art, the size of platinum crystals in the final product is roughly on the order of 30 to 40 angstroms. In contrast, the product achieved in the foregoing example provided (roughly) crystals in the 5% concentration on the order of 15 angstroms, in the 10% concentrations on the order of 17 angstroms, in the 15% concentration on the order of 18 angstroms, and in the final, 20% concentration product, crystals roughly on the order of 20 angstroms.

Comparative tests of electrodes formulated in accordance with the present invention and similar electrodes formulated in accordance with the prior art were made. The electrodes were formed on fibrous carbon mat substrate with the coating comprising 70% supported platinum and 30% TFE. In both cases, the electrode was formulated from supported platinum catalyst comprising 20% platinum and 80% carbon. For one electrode, the supported platinum catalyst powder was prepared in a single step using a concentration of 4 grams of platinum diammino dinitrite in 200 millileters of 30% nitric acid. This resulted in an effective platinum surface area, commonly referred to as electrochemical area (E.C.A.), of 100 to 125 millicoulombs per milligram of platinum. For the other electrode, the supported platinum catalyst was prepared sequentially in accordance with the foregoing example and yield and E.C.A. of on the order of 180 to 185 millicoulombs per milligram of platinum. The tests were made by measuring the voltage of the electrode when immersed at the surface of a 96% phosphoric acid ($H_3PO_4$) electrolyte operated at 275° F, both in an air ambient and in an oxygen ambient, the voltage being measured from the electrode to a standard hydrogen electrode immersed in the electrolyte. The tests were made with current drains of various loads, as expressed in amps per square foot.

| Amps /ft² | | In O₂ | | | In Air | |
|---|---|---|---|---|---|---|
| | 100 | 200 | 300 | 100 | 200 | 300 |
| Prior Art MV* | 788 | 751 | 728 | 700 | 649 | 603 |
| Invention MV* | 873 | 789 | 772 | 728 | 689 | 665 |

*Millivolts above standard hydrogen electrode

The foregoing test data is typical of a number of tests run with each type of electrode. In these tests, it was also determined that with the electrode operating in air, the current density which was achievable before driving the output voltage to zero was substantially 800 to 1200 amps per square foot for the conventional electrode and 1500 to 2000 amps per square foot for an electrode using the sequentially formed supported catalyst in accordance with the present invention. Thus it is seen that, not only is a larger maximum current density possible, but for any given current, the output voltage is higher, for electrodes utilizing the present invention than for the electrodes of the prior art.

In utilization of a supported platinum catalyst formulated in accordance with the present invention, the powder (containing a desired concentration of platinum catalyst dispersed on particles of inert carrier) is deposited in a well-known fashion on a suitable substrate so as to form an electrode, or a portion of an electrode. One exemplary process is disclosed in a commonly owned co-pending abandoned application Ser. No. 268,258, ELECTRODES FOR ELECTROCHEMICAL CELLS, filed on July 3, 1972 by R. D. Breault. Briefly, the Breault process involves the deposition of the supported catalyst powder, together with an agent for binding and wet-proofing the electrode, on a suitable electrode substrate, such as carbon fiber paper. First, the supported catalyst powder is mixed with a powder of polytetrafluoroethylene (Teflon), such as products sold under the designations TFE-30 and TFE-3170, by duPont. The mixture is suspended in a suitable vehicle, such as water or alcohol, to form a co-suspension, which is deposited, by any number of ways, on the substrate. For instance, deposition may be achieved by screen printing, spraying, or by a filter transfer process. The substrate may comprise a highly conductive, pyrolized fiber mat such as the carbon fiber paper by Kreha Corporation of America, Gardena, California. Then, the substrate, with the co-suspension deposited thereon, is heated at approximately 650° F for approximately 10 minutes in an air ambient in order to sinter the Teflon, causing it to diffuse slightly and to adhere to the particles of the carbon carrier, thereby providing a binder for the carrier and also a certain amount of wet-proofing to preclude total permeation of the catalyst structure by the electrolyte in the fuel cell, thereby permitting reactant gas to permeate the catalyst structure. Of course, other processes of deposition of the product of the present invention on a suitable substrate may be employed, and other substrates may be employed, all as is well-known in the fuel cell and catalytic chemistry arts.

Although the invention has been shown as described with respect to preferred embodiments thereof, it should be obvious to those skilled in the art that the foregoing and various other changes and omissions in the form and detail thereof may be made therein, without departing from the spirit and the scope of the invention.

Having thus described typical embodiments of my invention, that which I claim as new and desire to secure by Letters Patent of the United States is:

1. In the preparation of fuel cell electrode supported catalytic powders comprising a predetermined fixed amount of platinum disposed in a desired concentration on carbon support powders by the formation of the platinum from platinum diamino dinitrite, the steps of:
   a. mixing on the order of 10 grams of graphitized carbon powder, having a particular size on the order of 1–5 microns in diameter and a surface area of on the order of 75 to 200 square meters per gram, in a dilute solution comprising on the order of 1 gram of platinum diamino dinitrite dissolved in nitric acid, the concentration of the solution being such that the effective amount of the -dinitrite therein is less than that required for the formation of the entire predetermined fixed amount of the platinum on the carbon support powders;
   b. slowly concentrating the -dinitrite solution in the slurry until a nearly dry paste is formed, and removing all of said solvent from said solution, forming substantially a powder;
   c. heating the powder at a temperature in excess of the decomposition temperature of the -dinitrite, providing an intermediate product comprising carbon powders having less than the predetermined fixed amount of the platinum absorbed on the surface thereof;
   d. immersing the intermediate product in a dilute solution of platinum diamino dinitrite dissolved in a solvent, the concentration of the -dinitrite therein not exceeding that required to provide by formation on the intermediate product an additional amount of the platinum not exceeding the amount required to form the predetermined fixed amount of platinum on the carbon powders;
   e. repeating step (b);
   f. heating the powder at a temperature in excess of the decomposition temperature of the -dinitrite, providing powders having not more than the predetermined fixed amount of platinum on the surface thereof;
   g. and, if the concentration of platinum is less than the predetermined fixed amount, repeating steps (d) through (f) until such amount is provided.

2. A process according to claim 1 wherein said desired concentration is within the range of 1% to 50% of catalyst on 99% to 50% inert support powder.

3. A process according to claim 2 wherein said desired concentration is within the range of 5% to 20% of catalyst on 95% to 80% inert support powder.

4. A process according to claim 1 wherein said steps (d) through (f) are repeated between 3 and 10 times.

5. A process according to claim 4 wherein said steps (d) through (f) are repeated between 3 and 6 times.

6. A process according to claim 1 wherein said step (b) comprises stirring said slurry at a moderately elevated temperature below the boiling point of said solvent so as to slowly concentrate the salt solution in the slurry until a nearly dry paste is formed, and drying the paste by heating at a temperature somewhat in excess of the boiling point of said solvent.

7. In the preparation of fuel cell electrode supported catalytic powders comprising a predetermined fixed amount of platinum catalyst disposed in a desired concentration of between 5% and 20% platinum on between 95% and 80% inert support powders by the formation of the platinum crystals from platinum diammino dinitrite, the steps of:
   a. immersing graphitized carbon powders in a dilute solution of platinum diamino dinitrite in a solvent, the concentration of the solution being such that the effective amount of the -dinitrite therein is less than that required for the formation of the entire predetermined fixed amount of the platinum on the carbon support powders;
   b. slowly concentrating the -dinitrite solution in the slurry until a nearly dry paste is formed, and removing all of said solvent from said solution, forming substantially a powder;

c. heating the powder at a temperature in excess of the decomposition temperature of the -dinitrite, providing an intermediate product comprising carbon powders having less than the predetermined fixed amount of the platinum absorbed on the surface thereof;

d. immersing the intermediate product in a dilute solution of platinum diammino dinitrite dissolved in a solvent, the concentration of the -dinitrite therein not exceeding that required to provide by formation on the intermediate product an additional amount of the platinum not exceeding the amount required to form the predetermined fixed amount of platinum on the carbon powders;

e. repeating step (b);

f. heating the powder at a temperature in excess of the decomposition temperature of the -dinitrite, providing powders having not more than the predetermined fixed amount of platinum on the surface thereof;

g. and, if the concentration of platinum is less than the predetermined fixed amount, repeating steps (d) through (f) until such amount is provided.

* * * * *